US011852617B2

(12) United States Patent
Spartz et al.

(10) Patent No.: US 11,852,617 B2
(45) Date of Patent: Dec. 26, 2023

(54) THERMAL DESORPTION TUBE COLLECTION SYSTEM AND METHOD

(71) Applicant: MLS ACQ, Inc., East Windsor, CT (US)

(72) Inventors: Martin L. Spartz, Ellington, CT (US); Adam R. Klempner, Gardner, MA (US); Kelly Renee McPartland, West Hartford, CT (US)

(73) Assignee: MLS ACQ, Inc.

( * ) Notice: Subject to any disclaimer, the term of this patent is extended or adjusted under 35 U.S.C. 154(b) by 0 days.

(21) Appl. No.: 17/730,440

(22) Filed: Apr. 27, 2022

(65) Prior Publication Data

US 2022/0252554 A1   Aug. 11, 2022

Related U.S. Application Data

(63) Continuation of application No. 16/288,923, filed on Feb. 28, 2019, now Pat. No. 11,346,821.

(Continued)

(51) Int. Cl.
*G01N 30/12* (2006.01)
*G01N 30/74* (2006.01)
(Continued)

(52) U.S. Cl.
CPC ............ *G01N 30/12* (2013.01); *F25B 21/02* (2013.01); *G01N 1/2214* (2013.01);
(Continued)

(58) Field of Classification Search
CPC ............... G01N 1/2214; G01N 1/4022; G01N 2001/2282; G01N 2001/4033;
(Continued)

(56) References Cited

U.S. PATENT DOCUMENTS 4,998,433 A * 3/1991 Stumpf .................. F25B 21/04
422/89
5,611,846 A * 3/1997 Overton ................. G01N 30/68
95/82

(Continued)

FOREIGN PATENT DOCUMENTS

CN   2773662 Y   4/2006

OTHER PUBLICATIONS

Partial Search Report, dated May 24, 2019, from International Application No. PCT/US2019/020030, filed on Feb. 28, 2019. 14 pages.

(Continued)

*Primary Examiner* — Harshad R Patel
*Assistant Examiner* — Gedeon M Kidanu
(74) *Attorney, Agent, or Firm* — Michael Best & Friedrich LLP

(57) ABSTRACT

A thermal desorption tube collection system uses a thermoelectric cooler to collect and concentrate gas samples. In some modes, the operation of the cooler is reversed to flow the concentrated sample directly into a separator such as a gas chromatography system. Components resolved in time by a thermal desorption separator accumulate in a sample cell and are analyzed by electromagnetic radiation-based spectroscopic techniques. Also presented are methods for analyzing biogas samples.

18 Claims, 13 Drawing Sheets

Related U.S. Application Data

(60) Provisional application No. 62/636,628, filed on Feb. 28, 2018, provisional application No. 62/636,623, filed on Feb. 28, 2018.

(51) Int. Cl.
| | |
|---|---|
| *G01N 30/72* | (2006.01) |
| *G01N 30/60* | (2006.01) |
| *G01N 1/22* | (2006.01) |
| *G01N 30/08* | (2006.01) |
| *G01N 1/40* | (2006.01) |
| *F25B 21/02* | (2006.01) |
| *G01N 30/00* | (2006.01) |
| *G01N 30/02* | (2006.01) |

(52) U.S. Cl.
CPC .......... *G01N 1/4022* (2013.01); *G01N 30/08* (2013.01); *G01N 30/6073* (2013.01); *G01N 30/7206* (2013.01); *G01N 30/74* (2013.01); *G01N 2001/2282* (2013.01); *G01N 2001/4033* (2013.01); *G01N 2030/008* (2013.01); *G01N 2030/025* (2013.01); *G01N 2030/121* (2013.01); *G01N 2030/123* (2013.01); *G01N 2030/128* (2013.01); *G01N 2030/743* (2013.01)

(58) Field of Classification Search
CPC ....... G01N 2030/008; G01N 2030/025; G01N 2030/121; G01N 2030/123; G01N 2030/128; G01N 2030/743; G01N 30/08; G01N 30/12; G01N 30/6073; G01N 30/7206; G01N 30/74; A61K 47/645; A61K 47/646; A61K 47/6929; A61K 48/0041; A61K 9/1272; A61P 43/00; B82Y 5/00; C07K 14/46; C12N 15/87; F25B 21/02
See application file for complete search history.

(56) References Cited

U.S. PATENT DOCUMENTS

| | | | |
|---|---|---|---|
| 6,076,357 A * | 6/2000 | Holden | F25B 21/02 62/3.2 |
| 9,606,088 B2 | 3/2017 | Spartz et al. | |
| 2005/0092109 A1* | 5/2005 | Albro | G08B 21/14 73/863.83 |
| 2011/0260800 A1* | 10/2011 | Shanfield | H10N 19/101 331/70 |
| 2017/0122920 A1* | 5/2017 | Spartz | G01N 30/38 |
| 2017/0131243 A1* | 5/2017 | Lee | G01N 30/30 |
| 2019/0064131 A1 | 2/2019 | Wyatt et al. | |
| 2019/0094195 A1* | 3/2019 | Gentner | G01N 30/64 |

OTHER PUBLICATIONS

Kindlund, A., et al., "Quartz Crystal Gas Monitor with a Gas Concentrating Stage," Sensors and Actuators, 6: 1-17 (1984).

Barden, D., "The Peltier Effect—A 'Cool Technology' for Thermal Desorption," Schauenburg International Group, 1-5 (2011).

Marotta, L., et al., "Analaysis of Volatile Organic Compounds (VOCs) in Air Using US EPA Method TO-17," PerkinElmer, 1-4 (2015).

Wang, B., et al., "Characterising Volatile Organic Compounds from Sewer Emissions by Thermal Desorption Coupled with Gas-Chromatography-Mass Spectrometry," Chemical Engineering Transactions, 30: 73-78 (2012).

Xu, X., et al., "A Solid Trap and Thermal Desorption System with Application to a Medical Electronic Nose," Sensors, 8: 6885-6898 (2008).

International Search Report and Written Opinon , dated Jul. 17, 2019, 2019, from International Application No. PCT/US2019/020030, filed on Feb. 28, 2019. 21 pages.

International Preliminary Report on Patentability dated Sep. 10, 2020, from International Application No. PCT/US2019/020030, filed on Feb. 28, 2019. 13 pages.

* cited by examiner

THERMAL DESORPTION TUBE COLLECTION SYSTEM AND METHOD

RELATED APPLICATIONS

This application is a Continuation of U.S. patent application Ser. No. 16/288,923, filed on Feb. 28, 2019, which claims the benefit under 35 USC 119(e) of U.S. Provisional Application No. 62/636,628, filed on Feb. 28, 2018 and U.S. Provisional Application No. 62/636,623, filed on Feb. 28, 2018. All of the afore-mentioned applications are incorporated herein by this reference in their entirety.

BACKGROUND OF THE INVENTION

Gas Chromatography (GC) is used to resolve a mixture into its various components according to retention profiles of the different molecules passing through the GC column.

While the technique can separate mixtures containing hundreds of substances, identifying the molecules that elute from the column is more problematic. To address the need for rapid and sensitive identification of the molecular species present, GC has been integrated with techniques such as mass spectrometry (MS) or Fourier transform infrared (FTIR) spectrometry.

Gas chromatography-mass spectrometry (GC-MS) is probably the most widespread tandem technique in the analytical instrumentation industry today. GC-MS gas analysis systems are versatile and are employed across many different industries, particularly for environmental, chemical, petroleum, pharmaceutical, and toxicological applications.

While GC-MS is a fast, sensitive technique suitable for multiple component detection and spectral identification, capable of measuring atomic species and supported by large available spectral libraries, it suffers from many disadvantages. These include compound separation to prevent MS interferences, non-linear calibrations, poor precision and accuracy (requiring constant calibration) and limited dynamic range. Problems also are encountered when high concentrations are present that can allow for chemical ionization to occur, generating questionable data.

While GC-MS is the more commonly deployed solution, Gas Chromatography-Fourier Transform Infrared Spectrometry (GC-FTIR) provides a powerful gas analysis system that is particularly useful to distinguish among structural isomers that have identical electron impact and chemical ionization mass spectra.

Nevertheless, historically the designs of GC-FTIR systems have been plagued with their own limitations. For example, many GC-FTIR sample cells utilize a "light pipe" (typically a cell or cuvette used for passing both gas eluted from the GC column, and light from the FTIR interferometer). The light pipe is made relatively short to prevent peak dilution through the IR cell and its eventual IR detection or secondary detection. Since IR absorption is proportional to cell path length, this short path length limits the sensitivity (minimum detection limit (MDL)) of the technique. Problems also arise in cases in which GC peaks come off very quickly. Since the light pipe has a relatively large volume when compared to the flow rates of the GC, the gas can become diluted, making measurements more difficult.

More recently, GC-FTIR techniques and systems were disclosed in U.S. Patent Application Publication No. 2015/0260695 A1, with the title Process and System for Rapid Sample Analysis, published on Sep. 17, 2015, now U.S. Pat. No. 9,606,088, both documents being incorporated herein by this reference in their entirety. The general objective was to couple existing or newly developed systems, such as GCs, and/or optical spectroscopy systems, such as FTIRs, in ways that reduce or minimize the deficiencies encountered with conventional arrangements. In general, the sample was directed from a temporally-resolving separator to a sample cell, e.g., a gas cell that fully or partially integrates the components provided by the separator. Fluids, e.g., gas(es), were allowed to accumulate in the sample cell, effectively integrating their spectral signatures. Multiple spectra obtained over a time interval could then be averaged to best measure the integrated concentration in the sample cell. Obtaining a moving background that includes spectra from a previously eluted sample component, e.g., previously eluted chemical species, allowed for the analysis of the current eluting components without interference from previously eluted components. The integrated and averaged multiple spectra were corrected by using a similarly collected moving background, and the corrected data are compared to known spectra to identify one or more components, e.g., chemical species such as atoms, molecules, molecular fragments, ions, present in the sample component.

Analytical thermal desorption was adapted from injection procedures for GC's. It can be used in GC-MS or GC-FTIR systems, as well as other gas analysis systems. Injector liners were packed with sorbent that would absorb organic compounds in a sample gas. The sorbent was then inserted into the inlet of the GC's. This was common in occupational monitoring.

A more modern solution involves thermal desorption tubes (TDTs). These are sold commercially and, in most cases, are disposable. They are typically standardized glass tubes that are preloaded with the sorbent. Metal tubes also can be employed.

In thermal desorption tubes, volatiles are collected on the sorbent as the sample gas is passed through the tube. One popular sorbent for thermal desorption is poly(2,6-diphenyl-p-phenylene oxide). Then, the tube is connected to a GC where it is heated to release those volatiles.

When the sorbent is then heated in a flow of gas, the captured compounds are released and concentrated into a smaller volume. They then flow into the GC. Generally, these systems can be divided into single-stage systems and two-stage systems. In single-stage systems volatiles are collected on the sorbent tube, are then released by heating the tube in a flow of gas, and then flown directly into the GC. In contrast, in two-stage systems the gas stream from the sorbent tube is collected on a smaller tube integral with the TDT. This is also called a focusing trap or cold trap. Heating the trap releases the volatiles once again but in a smaller volume. This improves sensitivity and provides better GC performance. Typically, the focusing trap is held at or below room temperature. However, higher temperatures are sometimes used to reduce the amount of water inside the trap.

SUMMARY OF THE INVENTION

The present system and method concerns thermal desorption tube systems and electronic control if their temperatures. This system cools and/or heats the tubes with a thermoelectric cooler.

In a preferred embodiment, the system could be a stand-alone sampler that could be used optionally for hot and/or cold sampling. For example, in some embodiments, it further includes a battery so that even a power connection is not required. Cold sampling would be used for very volatile materials and possibly hot for semi volatiles to non-volatile compounds. Techniques described herein can also find application in detecting non-volatile, often very non-volatile, or low semi-volatile impurities in a gas. In one implementation, oil contamination (trace pump or compressor oil) present in a biogas sample, for example, is detected and, in many cases, quantified.

The system could be deployed as the front end of a GC as discussed in detail below. On the other hand, the system could be used as both a collector and desorber potentially. In some cases, the system might even desorb directly into the sample cell of the FTIR or other form of spectrometer. In some modes, the operation of the cooler is reversed to thereby heat the TDT and thus flow the concentrated sample directly into a separator such as a gas chromatography system.

Practicing the invention can have many advantages. For example, cooling the TDT increases the amount of material that can be collected. Samples can be concentrated, resulting in lower method detection limits (MDLs). By relying, as shown herein, on a Peltier thermoelectric device, the TDT can be both heated and cooled, to accomplish both collection and desorption in a simple and effective approach.

By using a cooled TDT, specialized TDTs are not as important. In this respect, it was possible to demonstrate the ability of collecting formaldehyde and other gases (typically vapors) not normally stored on the traditional TDT typically used for VOCs. Employing a heated TDT may potentially allow the collection of very large samples containing semi volatile materials. It might also make possible a faster sample collection process, with a higher flow rate through the TDT.

Some of the embodiments described herein relate to standalone TDT-cooler systems that can be battery operated and thus are portable and independent of finding an available power source. With a cooled TDT, standalone versions of the system described herein make possible the collection of larger samples than could be collected with an ordinary, uncooled TDT. An important application of a standalone device such as described herein relates to the collection and recovery of light or volatile species.

Embodiments that employ two channels make possible switching between collection and desorption and is particularly useful for online sampler/desorber systems.

Some sample analyses can be conducted without a GC separator (column), advantageously streamlining the equipment and methods in some embodiments, for example. Thus, some of the arrangements described herein do not require sample splitting, a common practice when using GC separators. Also not needed is a secondary trap, e.g., a cold or cryo trap, that is sometimes used to "focus" or further concentrate impurities in a sample gas.

In general, according to one aspect, the invention features a thermal desorption tube collection system comprising at least one thermal desorption tube and a thermoelectric cooler for cooling and/or heating the at least one thermal desorption tube.

In some cases, it could comprise two or more thermal desorption tubes, however. Each of the two thermal desorption tubes is connected to a manifold and/or a vacuum pump. Additionally, a flow through each of the two thermal desorption tubes is controlled by a mass flow controller or a rotometer.

In one possible mode of operation, a first thermal desorption tube is configured to operate in a sample collecting mode while a second thermal desorption tube is configured to operate in a sample analysis mode, and then they function could be reversed. So, in one case, a first thermal desorption tube is cooled by the thermoelectric cooler, while a second thermal desorption tube is heated by the same thermoelectric cooler.

In general, according to another aspect, the invention features a standalone thermal desorption tube collection system comprising at least one thermal desorption tube, a thermoelectric cooler for cooling and/or heating the at least one thermal desorption tube, and a controller powered by a battery.

In general, according to another aspect, the invention features a sample analysis system comprising two thermal desorption tubes configured for a sample collection and sample analysis ping pong arrangement, a thermoelectric cooler for cooling a sample collection thermal desorption tube while heating a sample analysis thermal desorption tube, a gas chromatography system for separating a vapor desorbed from the heated thermal desorption tube into components, and a sample cell for receiving the separated components from the gas chromatography system and electromagnetic radiation for a spectrometric analysis of compounds in the sample cell.

In examples, the spectrometric analysis is FTIR spectrometry. On other examples, a tunable laser spectrometer could be used.

In some cases, an input director system is provided for selectively coupling inputs of the thermal desorption tubes to either a gas to be analyzed or a carrier gas or a vent. An output director system can selectively couple outputs from the thermal desorption tubes to either the gas chromatography system or a vacuum pump or a vent.

In general, according to another aspect, the invention features a method for collecting a sample, comprising collecting a gas or vapor on one or more thermal desorption tube that is cooled by a thermoelectric cooler.

In general, according to another aspect, the invention features a method for collecting a sample, the method comprising selectively directing either a sample gas or a carrier gas to inputs of two thermal desorption tubes. The two thermal desorption tubes are cooled or heated by a ping pong temperature control system comprising a thermoelectric cooler.

In general, according to another aspect, the invention features a sample analysis method or system, comprising collecting oil present in a biomethane gas sample in a sample collection device, desorbing collected oil in the sample collection device, directing oil vapors to a sample cell, and obtaining a spectral response of the oil vapors in the sample cell using spectrometer, such as an FTIR analyzer.

The above and other features of the invention including various details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
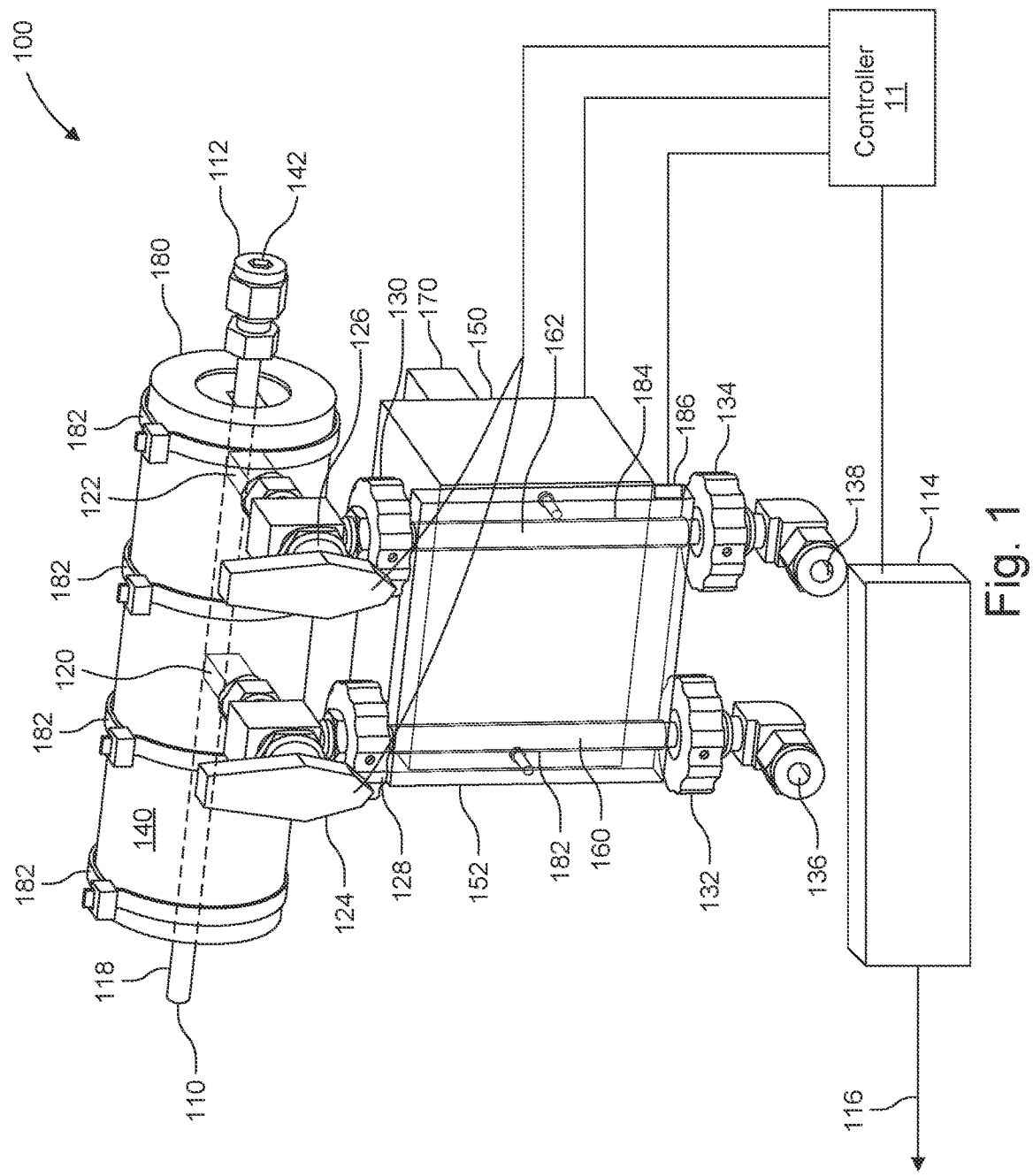
FIG. 1 is a perspective view of a TDT collection system of the present invention.

FIG. 1 shows a TDT (thermal desorption tube) collection system 100, which has been constructed according to the principles of the present invention.

In more detail, gas, such as hot exhaust gas from a chemical processing system or energy generation system, or gas from occupational monitoring is directed into a gas inlet 110. It then flows through a sample gas tube 118 to a gas outlet 112.

In the illustrated embodiment, the sample gas tube 118 is insulated from the surrounding environment in order to ensure that the gas stream maintains its temperature as it flows through the sample gas tube 118. Specifically, a foam outer covering, thermal insulator, 180 is shown in the specific illustrated embodiment. This is held in place by four zip ties 182 so that it can be easily removed and re-secured to the sample gas tube 118.

In other embodiments, rather than a foam covering, other insulation approaches could be used to ensure that the gas stream does not decrease in temperature as it flows through the TDT collection system 100. Such approaches include, for example, insulated fiber wraps.

In still other embodiments heater tape or other resistive heating system 140 is affixed to the gas tube 118, under the thermal insulator 180. The resistive heating system 140 is controlled by the controller 11 to maintain a prescribed temperature. Preferably feedback control is employed by placing a gas temperature sensor 142 in the tube 118, upstream of the tube 118, and/or downstream of the tube 118. The gas temperature sensor 142 detects the temperature of the gas flowing through the tube 118 and the sensor 142 is monitored by the controller 11. The controller 11 then drives the resistive heating system 140 to maintain a prescribed temperature for the gas flowing through the tube 118.

The sample gas tube 118 forms part of a manifold. Specifically, there is a first sample port 120 and a second sample port 122 through which gas samples can be taken from the gas stream flowing through the tube 118.

In the illustrated embodiment, the first sample port 120 connects to a first sample control valve 124. In a similar vein, the second sample port 122 connects to a second sample control valve 126.

In some embodiments, the control valves 124, 126 are manually operated. This is shown in the illustrated embodiment, where there are valve handles connected to the valve stems of each of the control valves 124, 126.

Nevertheless, in another embodiment, the first sample control valve 124 and the second sample control valve 126 are also under the control of a controller 11 and include electrically controlled mechanical actuators. Specifically, the controller 11 selectively opens and closes the first sample control valve and second sample control valve 124, 126 under computer control to control the timing of sampling and the length of the sampling.

After each of the sample control valves 124, 126 are respective top fittings 128, 130. The fittings 128, 130 connect the sample control valves 124, 126 to the first TDT 160 and the second TDT 162, respectively. Specifically, in the illustrated embodiment, the fittings 128, 130 include nubbed, annular rings that allow them to be unscrewed from the first TDT 160 and the second TDT 162.

In one specific implementation, the TDTs just slip through holes 182, 184 that have been bored through an aluminum plate/heat sink 152. There could be one TDT or two TDTs. In the illustrated embodiment, there is nothing holding TDTs 160, 162 in place except for the bottom fingernut connection of the bottom fittings 132, 134.

In most cases the holes are vertical and the TDTs point up so the cooler can rest on the manifold.

Each of the first TDT 160 and the second TDT 162 are held in the respective through-holes 182, 184 that extend through the solid thermal/heat sink 152. In the illustrated embodiment, the thermal/heat sink 152 is fabricated from a solid block of aluminum. The through-holes 182, 184 have been bored through that solid block and receive the respective first TDT 160 and the second TDT 162.

The bottoms of each of these TDT's 160, 162 connect respectively to a first bottom fitting 132 and a second bottom fitting 134. Like the top fittings 128, 130, the bottom fittings 132, 134 include annular rings that allow them to be unscrewed from the first TDT 160 and the second TDT 162.

The first bottom fitting 132 and the second bottom fitting 134 connect to a respective first vacuum port 136 and a second vacuum port 138. These vacuum ports are in fluid communication with a vacuum pump 114. Specifically, the vacuum pump is used to draw gas from the stream, through the manifold and the first TDT 160 and the second TDT 162 and then the gas is exhausted through exhaust port 116.

The temperature of the thermal heat sink 152 is controlled by a temperature control module 150. In the preferred embodiment, the temperature control module 150 is a thermoelectric cooler. In general, thermoelectric coolers use the Peltier effect to create a heat flux between the junction of two different types of materials within the coolers. These are solid-state devices that can function in a cooling mode or a heating mode to transfer heat from one side of the device to the other, with consumption of electrical energy, depending on the direction of the current. In some implementations, the Peltier cooling techniques described herein are employed to set an ideal temperature for sample collection (e.g., siloxanes from biogas) or, if desired, the temperature can be simply set just above 0° C., the freezing point of water. Other implementations rely on the thermoelectric cooler to heat and desorb the collected materials, in the process of analyzing the sample, by GC-FTIR, for example.

In the preferred embodiment, a temperature detector or sensor 186 is secured to the thermal/heat sink 152 or possibly to the thermoelectric cooler 150. This is used to detect the temperature at which the TDT's 160, 162 are being held and the information is provided to the controller 11, which then controls the operation of the thermoelectric cooler 150 in a feedback loop in order to maintain a desired setpoint temperature.

Some thermoelectric coolers operate without feedback. These devices when energized can go to a specific Delta T from ambient. Such a system would be much cheaper for home air testing or ambient air testing where the actual temperature is not as critical as say compliance emission testing where it is important to detect all possible compounds.

In one embodiment, a fan 170 is provided on the backside of the thermoelectric cooler 150 to allow for the efficient removal or collection of heat depending on the mode of operation.

Figure 2:
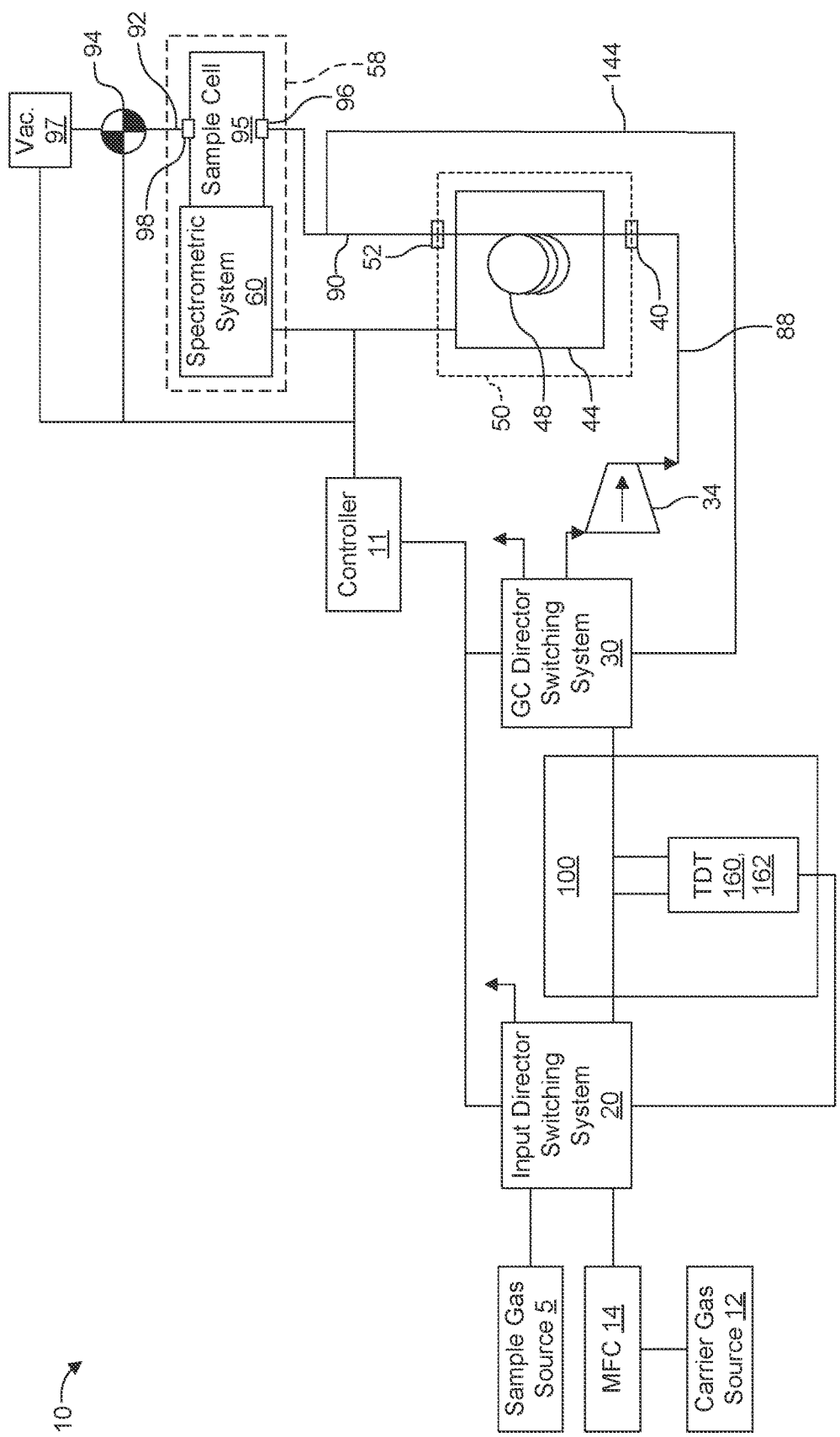
FIG. 2 is a schematic diagram of a GC-FTIR sample analysis system for testing samples collected in the TDTs and/or TDT collection system.

FIG. 2 shows an exemplary analysis system 10, including a separator 50 for separating a sample, collected on the TDTs 160, 162, into its components (e.g., separate compounds), a detector 58, such as a spectrometric system 60, for detecting the spectral response of those compounds in a sample cell 95, and a controller 11 that controls the system and uses the spectral information to identify the compounds of the sample and their concentrations.

The spectrometric system 60 can determine the spectral response of the compounds in the sample cell 95 in one or more of the following spectral regions: near-, mid- and/or far-infrared, visible, and/or ultraviolet (UV) (including vacuum ultraviolet (VUV)). Further, the spectrometric system can measure different characteristics, such as absorption spectra, emission (including blackbody or fluorescence) spectra, elastic scattering and reflection spectra, and/or inelastic scattering (e.g., Raman and Compton scattering) spectra of the compounds in the sample cell.

In the case of optical spectrometric systems, for example, different technologies can be employed. In Fourier transform infrared spectrometry (FTIR) systems, single beam spectra are generated by taking the raw interferograms from the FTIR spectrometer and then converting those interferograms to intensity versus wavenumber spectra. In other situations, spectra might be directly read-out as in the case where the spectrometric system 60 is a post dispersive system, which includes a broadband source and a spectrally resolving detector system. In other examples, the spectrometric system 60 includes a tunable optical source (e.g., tunable laser) and a detector. Here, the spectral information is a function of the time response of the detector, in such a pre-dispersive system.

Further, other detectors 58 such as a mass spectrometers could be used in place of optical spectrometer.

In general, the spectrometric system 60 is preferably sufficiently sensitive so that by analysis of the spectral information, the controller 11 can detect at least some of the sample compounds with low concentration, such as in a few percent to low parts per million (ppm) concentrations, or lower, to parts per billion (ppb).

In a specific embodiment, the spectrometric system 60 is a FTIR system. Its sample cell 95, also referred to as "gas cell" 95, is provided with an inlet port 96 for receiving a separator line 90. The sample cell 95 of the spectrometric system 60 has an outlet port 98 for venting the sample cell contents through an exit line 92. An exit valve 94 seals and/or controls the flow from the sample cell 95. A vacuum pump 97 can be provided after the exit valve 94 so that a vacuum or partial vacuum can be drawn on the sample cell 95.

The sample cell 95 can have windows made of ZnSe, KBr, BaF$_2$ or CaF$_2$, for example, and is fabricated from a suitable material, for instance welded stainless steel. The cell can be configured for multiple-path (also known as multiple-pass or long path) absorption. By increasing the path length traveled with respect to volume, multiple-pass arrangements can be used to measure low concentration components or to observe weak absorption spectral features without increasing the physical length or volume of the cell itself. Since the detection limit of the system is directly related to the volume/path length ratio, decreasing the volume or increasing the path length lowers the concentrations that can be detected. Assuming no signal losses, doubling the path length or reducing the volume in half will lower the detection limit by a factor of 2.

In certain embodiments, longer path lengths are used in combination with higher reflective coatings like enhanced silver, yielding a reflectivity in the 0.992 to 0.995 range or greater. Coating optimizations, in the IR region, for example, could further improve reflectivity. This allows for path lengths that are longer by a factor of 4 to 8 or even more.

Specific implementations utilize a sample cell 95 that is configured as a "White cell" type. The principles of a traditional White cell arrangement employ three spherical concave mirrors having the same radius of curvature. These principles can be modified, to improve image quality and optical throughput, as described, for instance, by Spartz et al. in U.S. Patent Application Publication No. 2015/0260695 A1 (now U.S. Pat. No. 9,606,088). In one example, the White cell type employed uses non-spherical concave mirrors cut onto a single metal or a glass blank, providing a fixed path length; the mirrors can be the solid end caps of the sample cell, allowing for smaller sample cells that are easier to align.

Other multiple pass cell designs that can be utilized include but are not limited to Herriott cells, Pfund cells, cavity-ring down cells, and integrating spheres.

In further examples, the sample cell 95 is a lightpipe flow through sample cell.

The sample components are separated in time by the separation system 50, which is preferably a gas chromatography system. The GC system has a gas chromatographic column 48. Often the column 48 is coiled in order to minimize overall size while maintaining sufficient tube or column length. Column 48 has a proximate end or inlet 40 for receiving sample from a sample inlet line 88 and a distal end or outlet 52 for directing resulting product through the line 90 to the sample cell 95 for analysis in the spectrometry system 60.

The column 48 is typically held within a temperature controlled chamber 44 with a heat source (e.g., an oven), such as a heating coil that is thermostatically controlled by the controller 11 in order to maintain a selected constant temperature during a gas chromatography analysis run. Typically, the heat source also provides sufficient heat to the chamber interior so that the temperature is sufficiently high to ensure that the sample reaches a gaseous state. In one implementation, the column 48 is resistively heated, thus avoiding the need for the oven. Specifically, column 48 is heated directly by passing a current through the metal column and monitoring the resistance to determine the temperature.

This system uses the TDTs 160, 162 as a concentrator. Further, if the sample contains trace concentrations, for example in the ppb or parts per trillion (ppt) range, a series of concentrators can be used in the analysis system 10. Such configurations allow the same system to be used for a wide variety of samples and sampling conditions.

In one mode of operation, the vacuum pump 97 draws a vacuum on the gas cell 95 and then the exit valve 94 is shut. In this mode, the cell 95 integrates and collects compounds of a sample for a certain time period.

In another mode of operation, the vacuum pump 97 draws the sample through a flow gas cell 95 and then the exit valve 94 is shut.

The system 10 further includes an input director switching system 20 and a GC director switching system 30 for controlling the flow of gases into and out of the TDT 160, 162 and GC 50.

The input director switching system 20 connects to a carrier gas source 12, such as nitrogen, helium or other essentially inert gas that will not interfere with detecting pollutants and other impurities. A mass flow controller (MFC) 14 is preferably provided in-line between the carrier gas source 12 and the input director 20 to control the flow rate of the carrier gas. Rotometers or other suitable flow regulators can be employed. The input director switching system 20 then flows the carrier gas through the TDT 24.

The GC director switching system 30 is connected for receiving sample and carrier gas from the TDT 160, 162. Output from the GC director switching system 30 then provides gas to GC 50. Possibly a compressor 34 maybe provided inline between the GC director switching system 30 and the GC 50.

In practice, the functions of the controller 11 are often distributed among multiple computer systems. For example, one or two computer systems will often perform the functions of real-time control of the system 10 and the TDT collection system 100, and collecting and logging the data from the systems 10, 100. This includes controlling the flow of gases and liquids throughout the system 10 by controlling one or more MFCs, e.g., MFC 14, input director 20, GC director 30, collection and desorption of TDT 160, 162, valves, e.g., exit valve 94, compressor 34, vacuum pump 96, and separator 50 in addition to the other components of the system 10. The real-time control functions further include collecting and recording the spectral information from the spectrometric system 60. Then, an additional computer system will often be utilized to analyze that data and identify the specific compounds of the sample. This includes analyzing the spectral information and how that information changes over time and recording and reporting the components/compounds present with their concentrations or mass to an operator via a user interface or to another computer. These data are compared with known preset amounts of concentrations (e.g., determined in a calibration procedure) that the spectrometric system 60 is capable of detecting.

In one example, the TDT collection system 100 is inserted directly into the analysis system 10. Then, under the control of the controller 11, the TDT 160, 162 are cooled and gas flowed through the tubes together or separately. At the same time, the controller 11 controls the input director switching system 20 to flow gas from the sample source 5 to the collection system 100 and operates the thermoelectric cooler 150. Gas flowing through tube 118 is vented by the GC director switching system 30 or coming through the TDTs is vented by input director switching system 20.

After the sample has been collected in the tubes 160, 162, the controller 11 reverses the polarity applied to the TE cooler 150 so that it heats the TDT 160, 162, together or separately to desorb the collected samples directly into the separator/GC. The sample in the sample cell 95 is then analyzed by the spectrometric system 60. In this mode, the input director switching system 20 flows carrier gas such as nitrogen from the carrier gas source under the control of the mass flow controller 14 through the TDT 160, 162 and through the GC director switching system 30 to the GC 50.

For some applications, the GC 50 can be omitted or at least bypassed. In cases in which the FTIR analyzer is part of a GC-FTIR system (such as that described in U.S. Pat. No. 9,606,088, to Spartz et al., for example), the GC 50 can be bypassed and the sample from the TDT can be introduced directly to the gas cell in the FTIR analyzer. In this mode, the GC director switching system 30 bypasses the GC 50 and sends the sample directly to the sample cell 95 using bypass line 144.

Arrangements that omit or bypass the separator (GC 50, for instance), can be particularly useful in the detection of non-volatile, often very non-volatile, or low semi-volatile impurities in a gas. One implementation relates to the detection and, often, the quantification of oil contamination present in a biogas sample. Often this oil is trace pump or compressor oil, etc. As known in the art, the term "biogas" or "biomethane" refers to any gas fuel derived from the decay of organic matter, e.g., a mixture of methane and carbon dioxide produced by the bacterial decomposition of sewage, manure, garbage, or plant crops.

The system described herein can be designed to handle the high biogas volumes needed for collecting a sample sufficiently large for ppt (parts per trillion) or pg/L (picograms per liter) MDLs detection. A sensitivity of 20 ng, for example, may require a 1,000 L of biomethane to reach 20 pg/L. Thus, detecting MDLs in the pg/L range can involve passing very large amounts of biogas through the TDT.

Operating with such large volumes is facilitated by approaches that collect heavy impurities preferentially or exclusively. In one embodiment, the TDT stationary phase utilizes a material that preferentially or exclusively collects non-volatile compounds such as oil. For example, the material can be a sorbent designed to collect only heavy components. It is also possible to use a material that may not be a sorbent in the true sense of the word but rather provide a surface area onto which heavy components (e.g., oil or other non- or semi-volatile organic compounds) can stick.

In applications targeting biogas, the material also can be of a type that does not trap (or lets pass through) volatile organic compounds (VOCs) and/or water. In other cases, the TDT material is held at a temperature that is sufficiently high to reduce or minimize trapping, sorbing, binding or otherwise collecting VOCs and/or water onto the material.

Some specific examples of TDT materials that can be employed include glass wool, glass beads, metal frit and the like. Using such a material would allow operating at very large volumes and high flow rates to collect more sample at a higher rate.

Oil collected on the TDT stationary phase can be desorbed or otherwise released directly to the FTIR analyzer. For example, the TDT is rapidly heated (using a suitable heating device, e.g., heating tape, heating jacket, oven, Peltier heater, cartridge heater, immersion heater, etc.) to vaporize the oil and direct the oil vapors, typically in a carrier gas, via a heated transfer line to the FTIR analyzer. In one implementation, the TDT is heated by the thermoelectric cooler (e.g., thermoelectric cooler 150) described herein.

Figure 3:
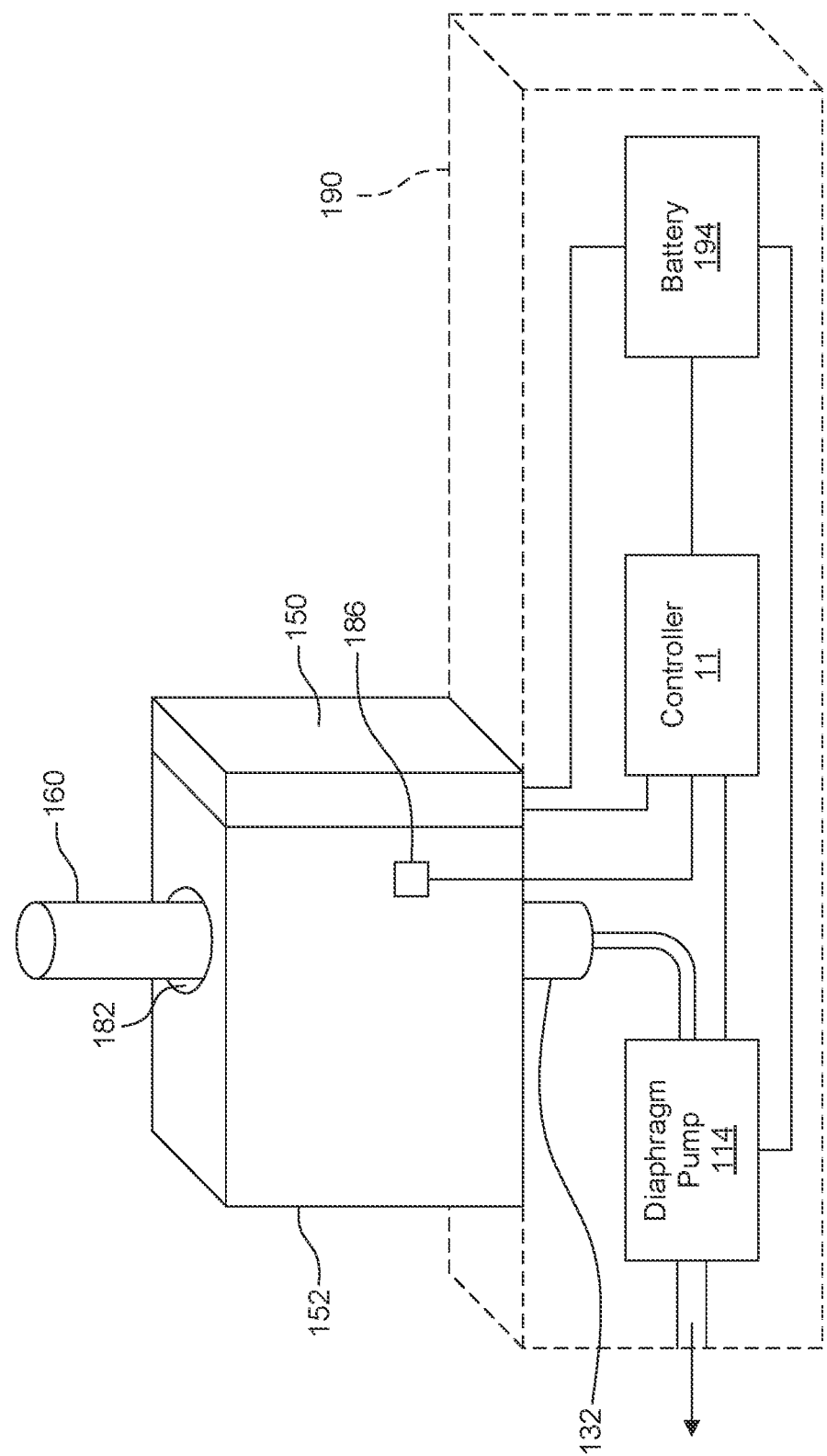
FIG. 3 is a schematic perspective view of a TDT collection system for occupational and home air testing.

FIG. 3 shows a TDT (thermal desorption tube) collection system 100, according to another embodiment.

Here, a TDT 160 is held upright in a through-hole 182 that extends through a solid thermal/heat sink 152. This heat sink 152 may include an insulation layer, not shown, to provide insulation from the surrounding environment to enable better temperature control. This thermal/heat sink 152 can also be fabricated from a solid block of aluminum. The through-hole 182 has been bored through that solid block.

The heat sink 152 is supported on a lower housing 190. The lower housing 190 has a lower fitting 132 provided on its top face. This fitting is located underneath the through-hole 182 of the heat sink 152. In one embodiment, the TDT 160 is inserted into the through-hole 182 of the heat sink 152. It is then press fit into the lower fitting 132 which seals against the tubes outer surface.

The lower housing 190 contains a diaphragm pump 114, a controller 11, and a battery 194, in one embodiment.

The diaphragm pump 114 is connected to the lower fitting 132. It draws air through the TDT 160 and then exhausts that air to the ambient environment. In this way, air is drawn through the TDT so that any volatiles chemicals can be retained in the sorbent within the tube 160.

As before, the temperature of the thermal heat sink 152 is controlled by a temperature control module 150. In the preferred embodiment, the temperature control module 150 is a thermoelectric cooler. As before, a temperature detector 186 is secured to the thermal/heat sink 152 or possibly to the thermoelectric cooler 150. This is used to detect the temperature at which the TDT 160 is being held. This information is provided to the controller 11, which then controls the operation of the thermoelectric cooler 150 in a feedback loop in order to maintain a desired setpoint temperature.

The illustrated embodiment described with reference to FIG. 3 is intended for ambient air testing such as in the home or factory. Thus, in one embodiment, the system is powered by an onboard battery 194. This allows it to be located for easy testing at any location even if a wall plug power is not available.

Figure 4:
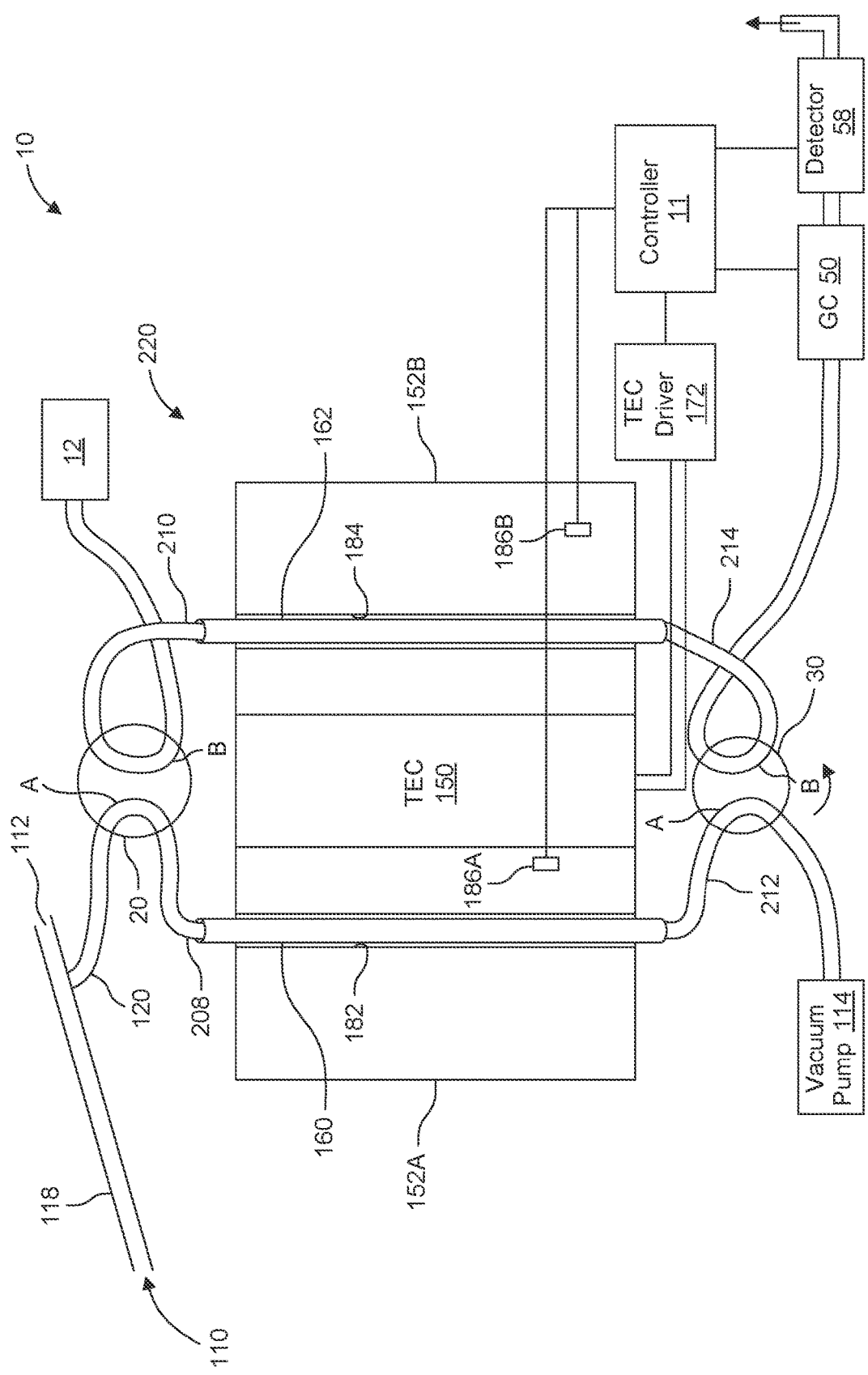
FIG. 4 is a schematic cross-section view of a dual TDT collection system for a GC-FTIR sample analysis system for ping-pong operation.

FIG. 4 shows an integrated collection and analysis system 10, which can collect samples using TDT's in a ping-pong fashion. The two-channel approach illustrated in this embodiment can switch or alternate between collection and desorption and can find applications for online sampler/desorber systems.

In more detail, gas, such as hot exhaust gas from a chemical processing system or energy generation system, or gas from occupational or ambient air monitoring is directed into a gas inlet 110. It then flows through a sample gas tube 118 to a gas outlet 112.

Gas samples can be taken from the gas stream via sample port 120, which connects to an input director switching system 20. This example includes two arcuate loops A, B. In the illustrated setting of the input director 20, the input gas sample flows through arc A of the input director 20 to a first input tube 208 that carries the gas to a first TDT 160.

At the same time, arcuate loop B of the input director 20 connects to a second input tube 208, which connects to a second TDT 162.

The first TDT 160 and the second TDT 162 are held in a ping-pong temperature control system 220. In more detail, the temperature control system 220 comprises a thermoelectric cooler 150. The control system 220 further includes a first heat sink 152A and a second heat sink 152B, on either side of the thermoelectric cooler 150.

In this configuration, the first heat sink 152A and the second heat sink 152B are located on opposite sides of thermoelectric cooler 150. Thus, when the thermoelectric cooler 150 is operated, one of the heat sinks is being cooled while the other heat sink is being heated. Then, the operation can be reversed by simply switching the polarity of the thermoelectric cooler 150.

The temperatures of the heat sink 152A and 152B are monitored by separate temperature detectors 186A, 186B that are secured to the thermal/heat sink 152 or possibly to the thermoelectric cooler 150. They are used to detect the temperature at which the TDTs 160, 162 are being held. This information is provided to the controller 11, which then controls the operation of the thermoelectric cooler 150 in a feedback loop in order to maintain a desired setpoint temperature.

Each of the TDT's 160, 162 connects to respective output lines 212, 214. These output lines couple the TDT's 160, 162 to an output director 30. This output director similarly has an arcuate loop A and arcuate loop B.

The output director 30 selectively couples the output lines 212, 214 to either a vacuum pump 114 or a gas chromatography system or separator 50. The gas chromatography (GC) system 50 in turn is coupled to a detector 58. In one example, this detector 58 is a spectrometric system 60 with a sample cell 95 as described earlier. In some embodiments, the GC is omitted/bypassed and output 212, 214 are passed by director 30 directly to detector 58.

Finally, the controller 11 controls the operation of the GC 50, detector 58, both the input director 20 and the output director 30. It further controls the operation of the thermoelectric cooler 150 via a thermoelectric driver 172.

With the input director 20 and the output director 30 set as illustrated, the first TDT 160 is connected to the vacuum pump 114. It thus draws in the gas to be sampled from the sample gas tube 118 through the first TDT 160. Further, the controller 11 via the thermoelectric driver 172 drives the thermoelectric cooler 150 so that the first heat sink 152A is being cooled. Thus, volatiles in the sample gas are trapped in the sorbent in the first TDT 160.

On the other hand, the thermoelectric cooler 150 heats the second heat sink 152B. The arcuate tube B of the input director is connected so that the second TDT 162 is connected to the carrier gas source 12. In some embodiments, a mass flow controller controls the rate at which the carrier gas 12 flows into the TDT 162.

Since the second TDT 162 is being heated, the volatiles desorb from the TDT 162 and flow through the second output line 214 through the output director 30 to the gas chromatography system or separator 50. From there, the peaks eluting from the GC flow into the detector 58 for analysis.

Then, the input director 20 and the output director 30 are preferably switched so that the first TDT 160 is placed in desorption mode while the second TDT 162 is placed in sampling mode.

In more detail, when the input director 20 is switched, the input gas sample flows through arc A of the input director 20 to a second input tube 210 that carries the gas to a second TDT 162.

At the same time, arcuate loop B of the input director 20 connects to the input tube 210, which connects to a second TDT 162, to the carrier gas source 12.

The output director 30 is also switched. Arcuate loop A now connects the second output line 214 to the vacuum pump 114, and arcuate loop B connects the first output line 212 to the separator or GC 50.

With the input director 20 and the output director 30 in the new setting, the second TDT 162 is connected to the vacuum pump 114. It thus draws in the gas to be sampled from the sample gas tube 118 through the second TDT 162. Further, the controller 11 via the thermoelectric driver 172 switches the operation of the thermoelectric cooler 150 so that the second heat sink 152A is being cooled. Thus, volatiles are trapped in the sorbent in the second TDT 160.

At the same time, the thermoelectric cooler heats the first heat sink 152A. The arcuate tube B of the input director 20 is connected so that the first TDT 160 is connected to the carrier gas source 12. In some embodiments, the mass flow controller controls the rate at which the carrier gas 12 flows into the first TDT 160.

Since the first TDT 160 is being heated, the volatiles desorb from the TDT 160 and flow through the first output line 214 through arcuate tube B of the output director 30 to the gas chromatography system or separator 50. From there, the peaks eluting from the GC flow into the detector 58 for analysis.

One embodiment includes a separator 50 for separating a sample, collected on the TDTs 160, 162, into its components (e.g., separate compounds), a detector 58, such as a spectrometric system 60, for detecting the spectral response of those compounds in a sample cell 95, and a controller 11 that controls the system and uses the spectral information to identify the compounds of the sample and their concentrations.

Figure 5:
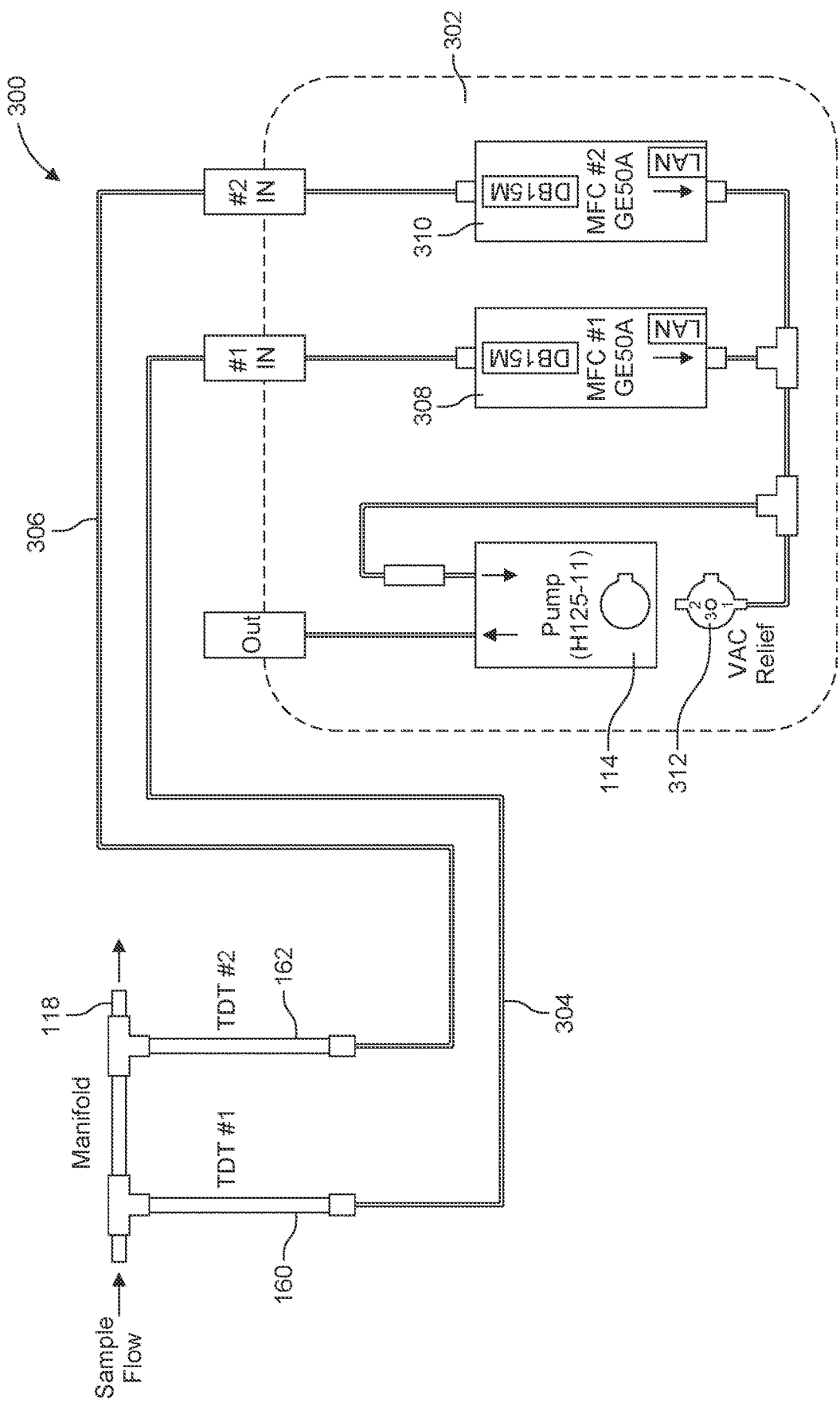
FIG. 5 is a schematic diagram of a flow control arrangement for operating the sample collecting TDTs.

Flow through the TDTs can be driven and controlled using one or more suitable devices. Shown in FIG. 5, for example, is arrangement 300 in which TDT 160 and TDT 162, essentially as described above, are connected to vacuum pump 114. As before, sample gas is introduced through sample gas tube 118. Flow from TDTs 160 and 162 (via conduits 304 and 306) is controlled, respectively, by mass flow controllers (MFCs) 308 and 310. In one example, the MFCs used are elastomer sealed digital mass flow controllers, e.g., MKS GE50A. Rotometers or other suitable devices also can be utilized. The arrangement also includes vacuum relief valve 312.

In still a different mode of operation, the system 100 is operated in "hot mode." Such a mode could be used when collecting semi volatile compounds, for example. In this mode of operation, the thermoelectric cooler 150 would heat one or both of these thermal desorption tubes 160, 162 to a temperature that would be high enough such that they did not collect water. For example, in one embodiment, the tubes are held at a temperature higher than 100° C. At this temperature, potentially much larger volumes could be sampled.

In further embodiments, the equipment and techniques described herein can be applied or adapted to biogas analysis.

High quality biogas is required in some applications. For compression engines, for example, impurities can harm the gas distributing system or the gas utilities or cause unwanted exhaust products. Thus, it is important to detect biogas contaminants, even when present in very low concentrations. One such impurity is oil.

Aspects of the present invention present an approach for handling very large biogas samples to detect the presence of oil (e.g., pump or compressor oil, derived, for instance, from the engine itself) at levels as low as 10 to 20 nanograms (ng).

A method that can be used comprises collecting oil in a sample collecting device, the thermal desorption tube (TDT) 160, 162, for example, releasing the sample directly to a gas cell 95 of the FTIR analyzer and obtaining a spectral response of the oil present in the cell. A system for analyzing oil in biomethane comprises at least one sample collecting device, a TDT, for example, and an FTIR analyzer. The FTIR analyzer includes the sample cell 95, e.g., as described above, for receiving the sample released from the sample collecting device. In some implementations, the TDT is part of the thermal desorption tube collection system described above.

In one embodiment, oil is collected on a first TDT (device 160 in FIG. 5, for example) previously purged and ready to receive a new sample. In the meantime, oil trapped by the second TDT (e.g., device 162 in FIG. 5), is released (e.g., by heated N2 carrier gas from source 12) from the stationary phase of the TDT and directed to the FTIR analyzer. Once all the oil has been released from TDT 162, the second TDT 162 can be swept by clean and preferably heated N2 gas in preparation for receiving a new sample. The first TDT (device 160) can now be heated to release the trapped oil and direct it to the FTIR analyzer. Alternating the operation of the two TDTs (devices 160 and 162) can double the flow rate to the FTIR analyzer (to 2 times 25 mL/min, for example). In contrast to arrangements in which a second, focusing, TDT is employed as a second trap downstream of the first, the ping pong arrangement of the two TDTs alternates the sample collection operation between the two collection devices (TDT 160 and TDT 162).

Principles described herein also can be used or adapted to detect and often quantify the presence of herbicides, pesticides and the like in ambient air.

Furthermore, it may be possible to conduct some aspects of the invention using spectral response of the analyte, e.g., oil, in sample cell 95 in other spectral regions e.g., visible, and/or ultraviolet (UV) (including vacuum ultraviolet (VUV)). Further, the spectrometric system can measure different characteristics, such as absorption spectra, emission (including blackbody or fluorescence) spectra, elastic scattering and reflection spectra, and/or inelastic scattering (e.g., Raman and Compton scattering) spectra of the compounds in the sample cell.

The invention is further illustrated by the following non-limiting examples.

Example 1—Cold Sampling of Acrolein, Acetaldehyde and Formaldehyde on A2 TDTs

The purpose of this experiment was to determine a sampling temperature that yields >50% recovery for acrolein, acetaldehyde and formaldehyde on A2 TDTs (Gerstel). A 191° C. sample stream consisting of 2% moisture, acrolein, acetaldehyde and formaldehyde in nitrogen was run to the sampling manifold. A 2 L sample was collected on a pair of A2 TDTs loaded into the TDT collection system 100 at a rate of 100 mL/min for 20 min, with one TDT at room temperature and one in a 0° C. container. Sampling was repeated twice more for a total of three consecutive sample pairs (Sample 6, 7 and 8). After sampling was complete, TDTs were immediately transferred to the refrigerator, where they were stored for 10-30 minutes. TDTs were run on GC and analyzed using absorbance spectra and manual validation. Results for Sample 7 are not shown below because the run data for the 0° C. TDT was not useable. The instrument method stalled with outlet valve open during the run.

| | A2 TDTs | | | | | | | | | | |
|---|---|---|---|---|---|---|---|---|---|---|---|
| | Sample 6 | | | | Sample 8 | | | | Average | | |
| | 23° C. | | 0° C. | | 23° C. | | 0° C. | | 23° C. | | 0° C. |
| | Mass (ng) | Percent Recovery | Mass (ng) | Percent Recovery | Mass (ng) | Percent Recovery | Mass (ng) | Percent Recovery | Mass (ng) | Percent Recovery | Mass (ng) | Percent Recovery |
| Acrolein | 2010 | 39.90% | 3230 | 64.11% | 1910 | 37.91% | 3260 | 64.71% | 1697 | 33.68% | 3245 | 64.41% |
| Acetaldehyde | 815 | 40.75% | 1440 | 72.00% | 961 | 48.05% | 1430 | 71.50% | 855 | 42.77% | 1435 | 71.75% |
| Formaldehyde | 663 | 33.15% | 1480 | 74.00% | 600 | 30.00% | 1345 | 67.25% | 798 | 39.88% | 1412.5 | 70.63% |

The table below shows results from two TDTs spiked with a BTEX and styrene standard, dry purged, and run using either method, where VIAQ is the known abbreviation for "Vehicle Indoor Air Quality". Percent recoveries are comparable between the two instrument methods. It is important to note that the standard has been in use for 3 weeks, which is why recoveries are <90%. Benzene and toluene may be lower due to evaporation off the glass wool when the tube was being spiked with the liquid.

| | BTEXS with VIAQ Inst Method | | | |
|---|---|---|---|---|
| | BTEXSN | | VIAQ Method | |
| | Mass (ng) | Percent Recovery | Mass (ng) | Percent Recovery |
| Benzene | 1380 | 66.61% | 1190 | 57.44% |
| Toluene | 1690 | 82.71% | 1410 | 69.01% |
| Ethylbenzene | 1870 | 91.16% | 1600 | 78.00% |
| m-Xylene | 1740 | 83.57% | 1590 | 76.37% |
| p-Xylene | 1810 | 88.12% | 1760 | 85.69% |
| o-Xylene | 1780 | 87.38% | 1850 | 90.82% |
| Styrene | 1760 | 89.57% | 2000 | 101.79% |

Example 2—Biogas Analysis

Since, in many instances, the biogas analysis will not require a detailed breakdown to the level of each and every oil species present, a reading for an entire class is sufficient. Thus, in some implementations, the system and method described above can be used to measure oil as a single component at trace amounts of 10 to 20 ng, for example.

The IR spectra can be analyzed by a suitable technique. Some embodiments rely on calibrations based on decane, undecane, dodecane spectra to determine the mass level of oil present (in ng). Dodecane, for example, is commonly used to match heavy hydrocarbons like diesel fuel and oil. Techniques described in U.S. patent application Ser. No. 16/113,856, filed on Aug. 27, 2018, with the title Carbon Ladder Calibration, incorporated herein by this reference in its entirety, can be used to predict which compound is most similar to the sample and use this compound to obtain the most precise reading of oil mass. It is expected that the ratio of $CH_2$ to $CH_3$ will determine the best match for the oil. For instance, a compound such as decane has a 4 to 1 ratio of $CH_2$ to $CH_3$, whereas dodecane has a 5 to 1 ratio.

Figure 6:
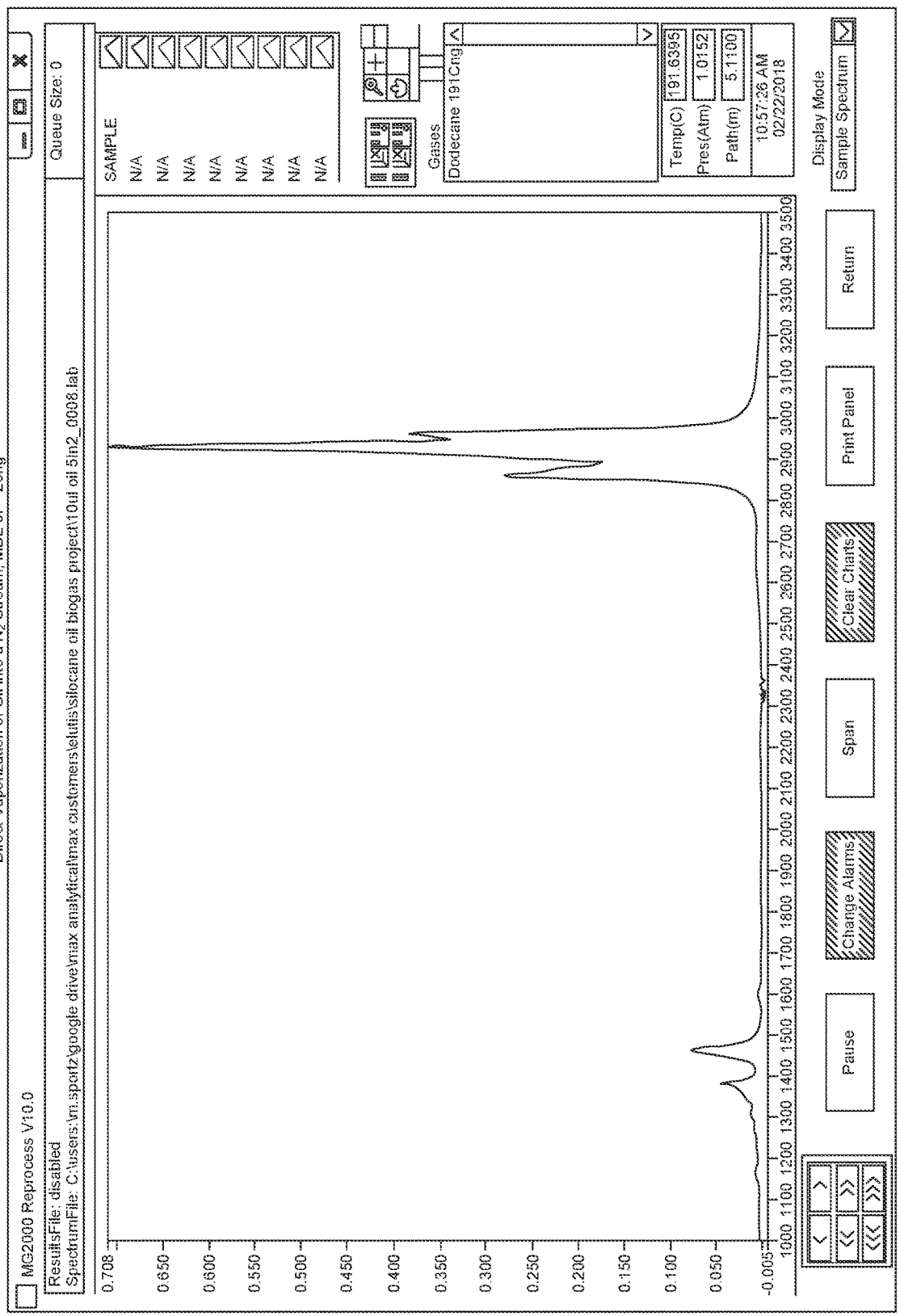
FIG. 6 is a plot of absorbance as a function of wavenumber obtained by the direct vaporization of oil in a N2 with an MDL of about 20 ng.
Figure 7:
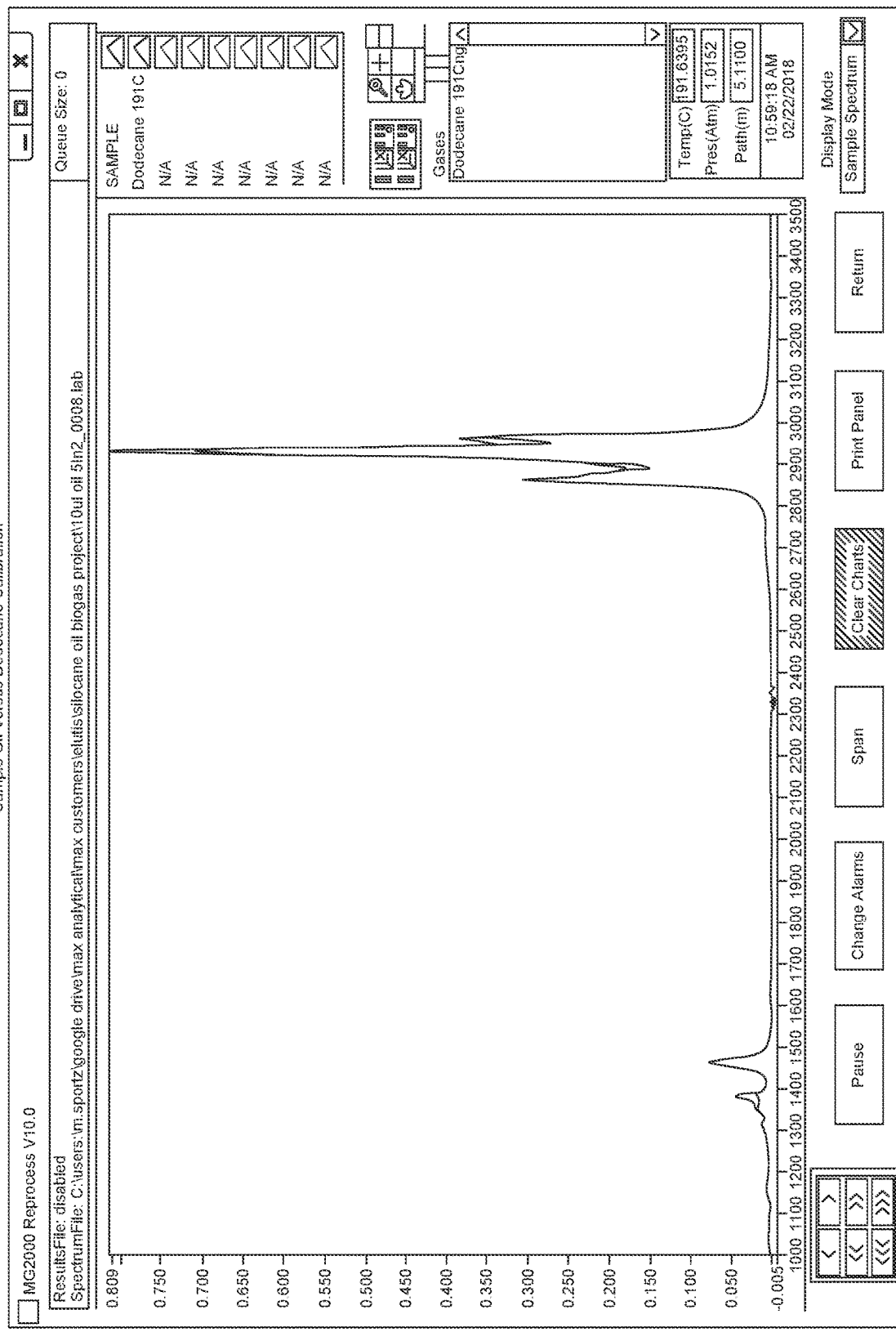
FIG. 7 presents a plot of absorbance as a function of wavenumber for an oil versus dodecane calibration.
Figure 8:
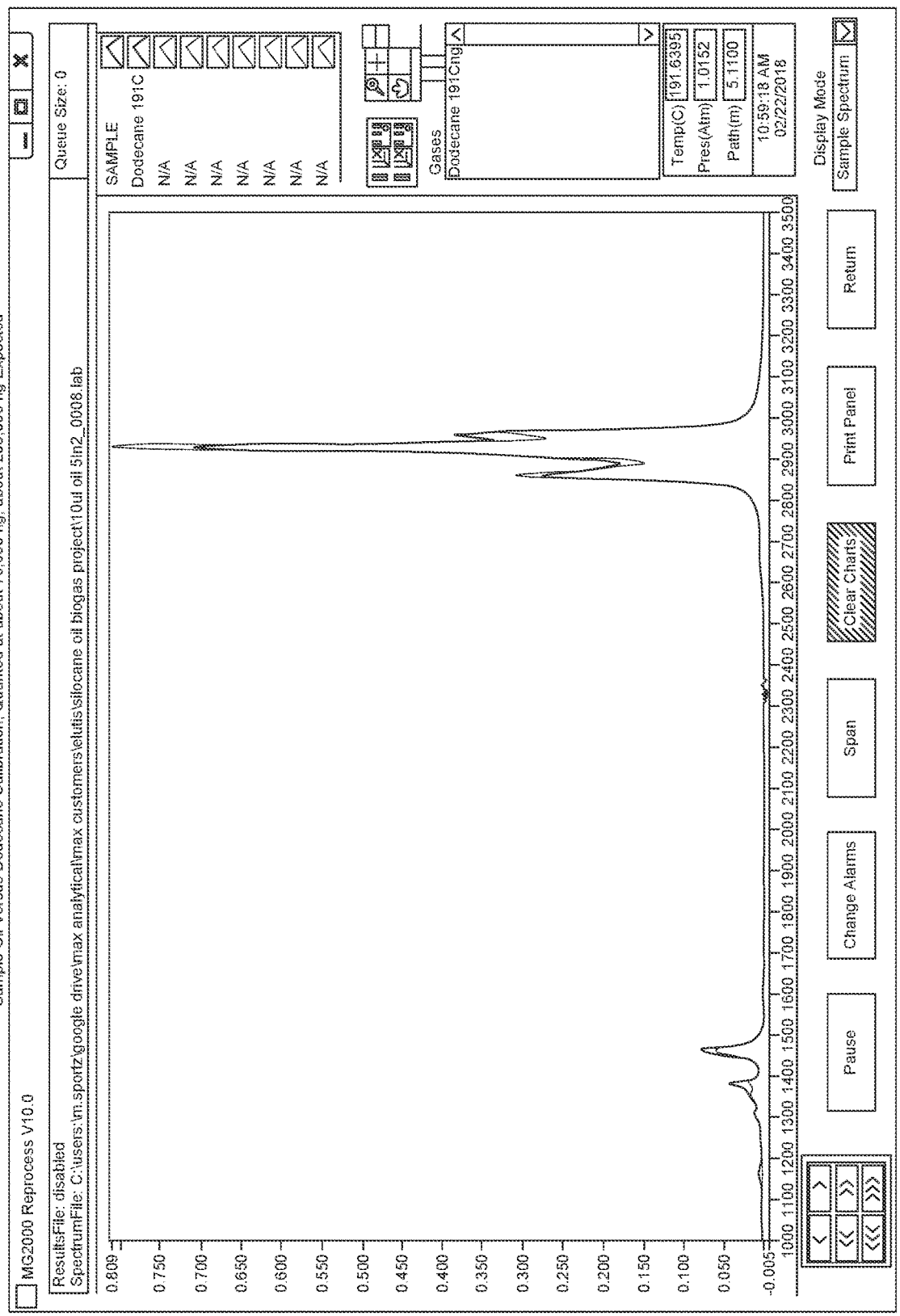
FIG. 8 through 12 are plots of absorbance as a function of wavenumber spectra of a sample oil using various hydrocarbons calibrations, with 205,000 ng oil being expected.
Figure 9:
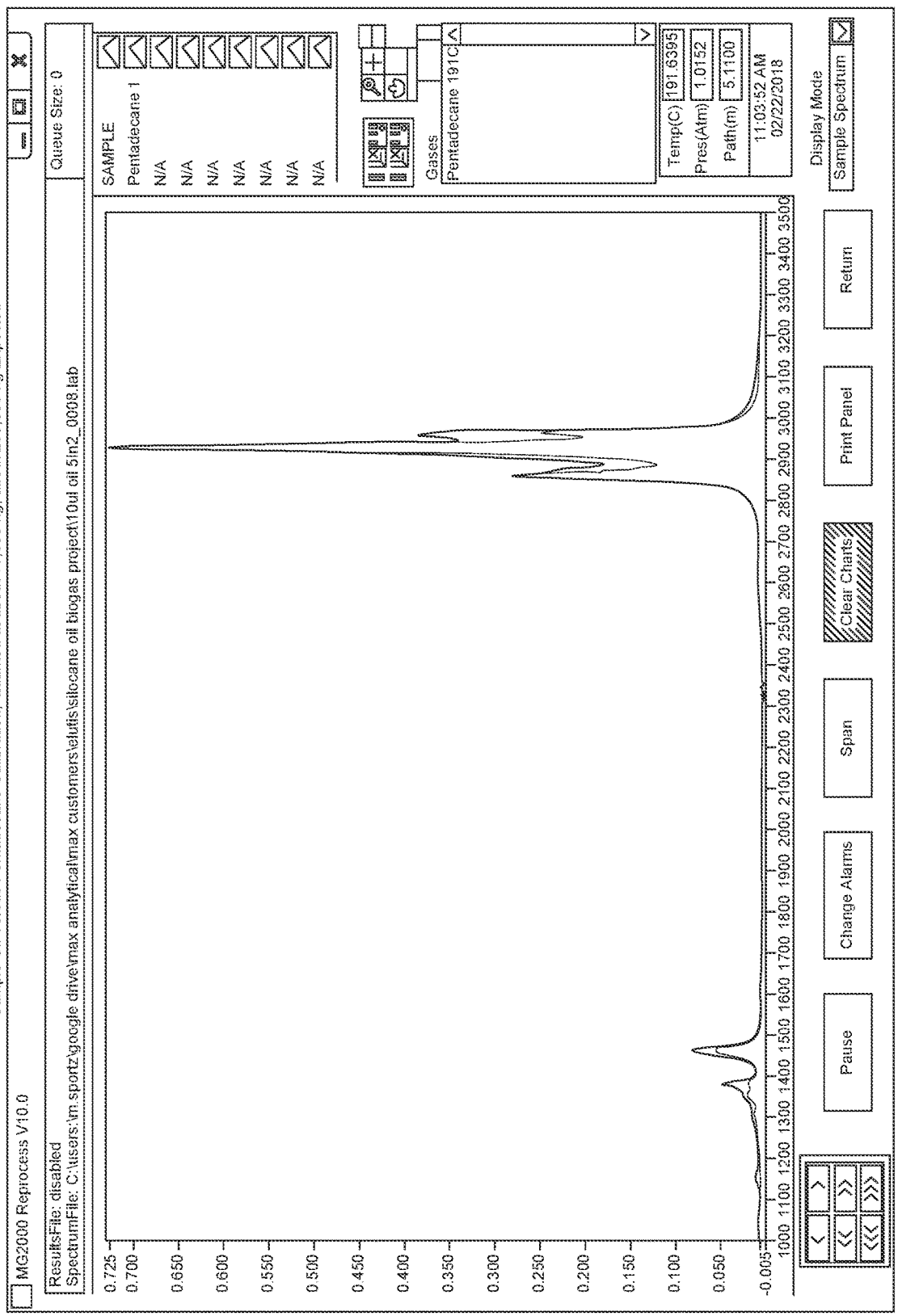
Figure 10:
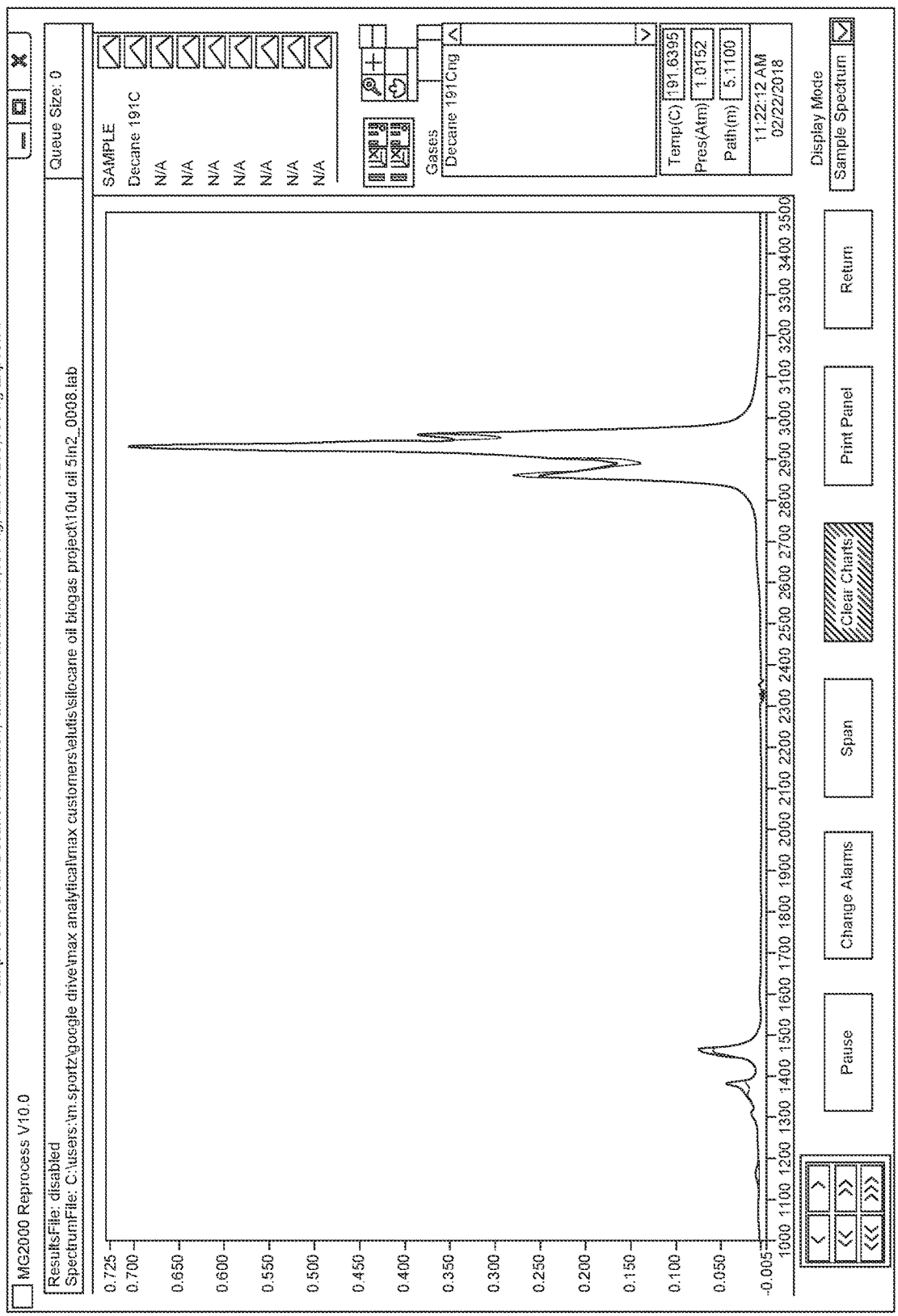
Figure 11:
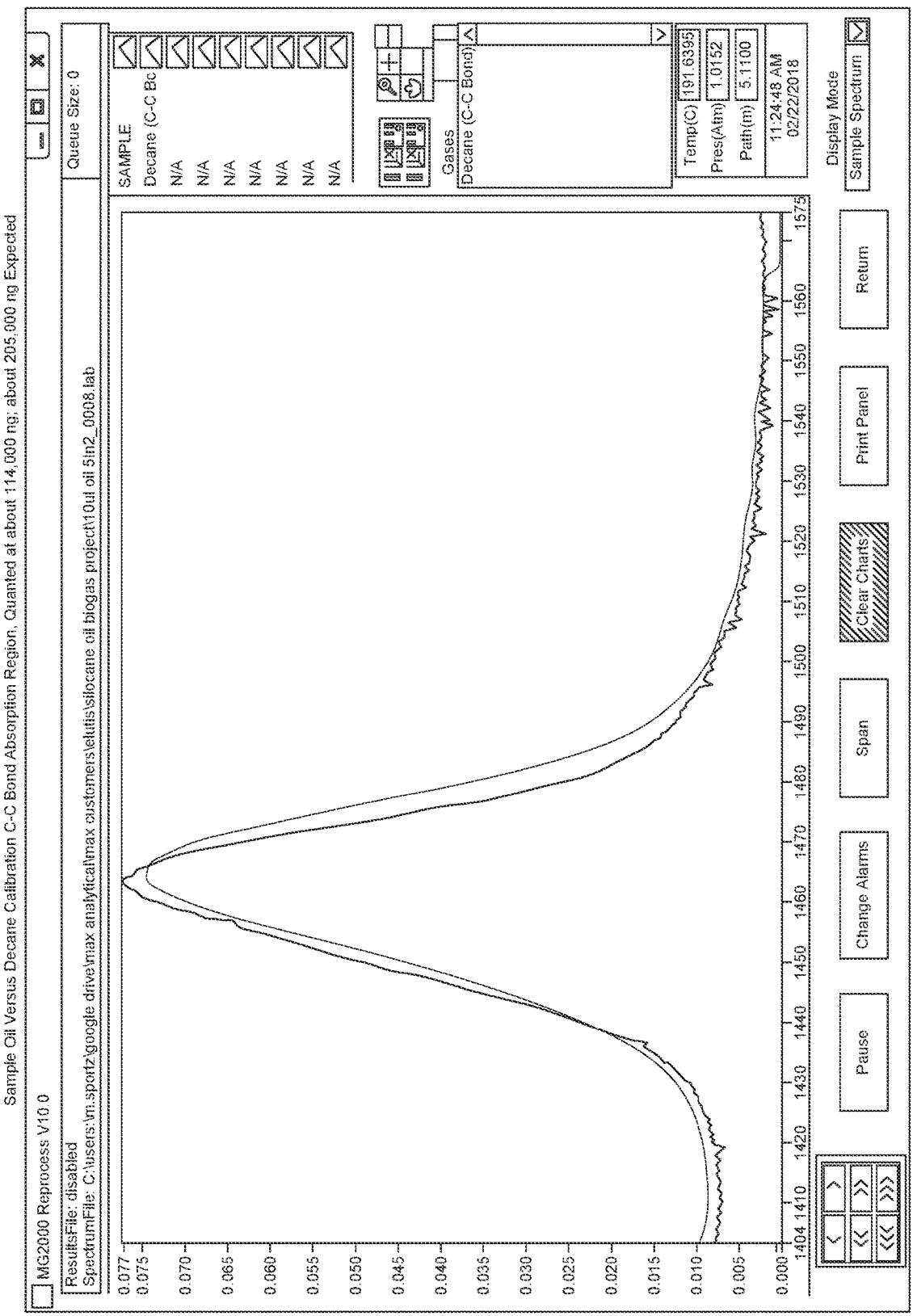
Figure 12:
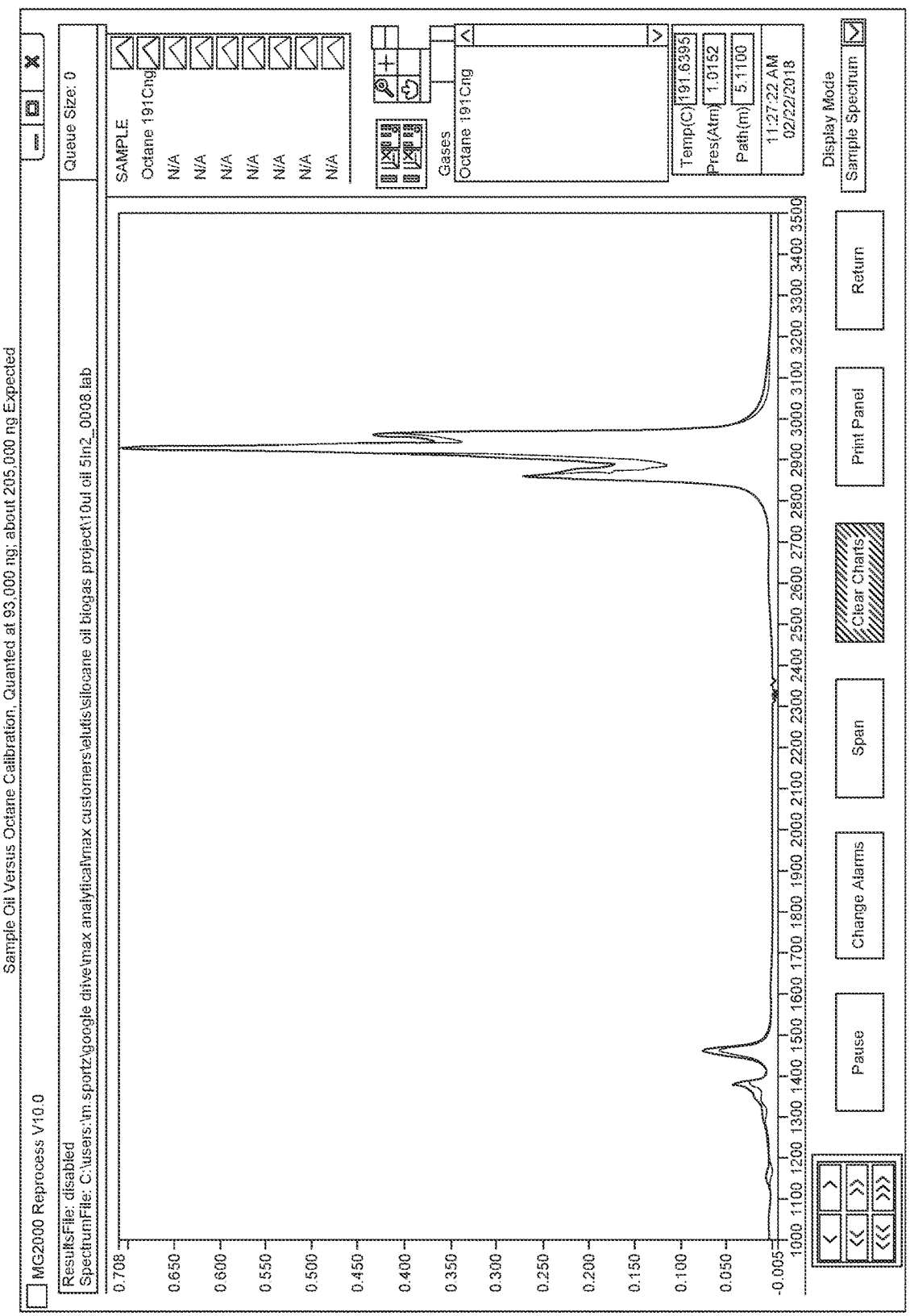
Figure 13:
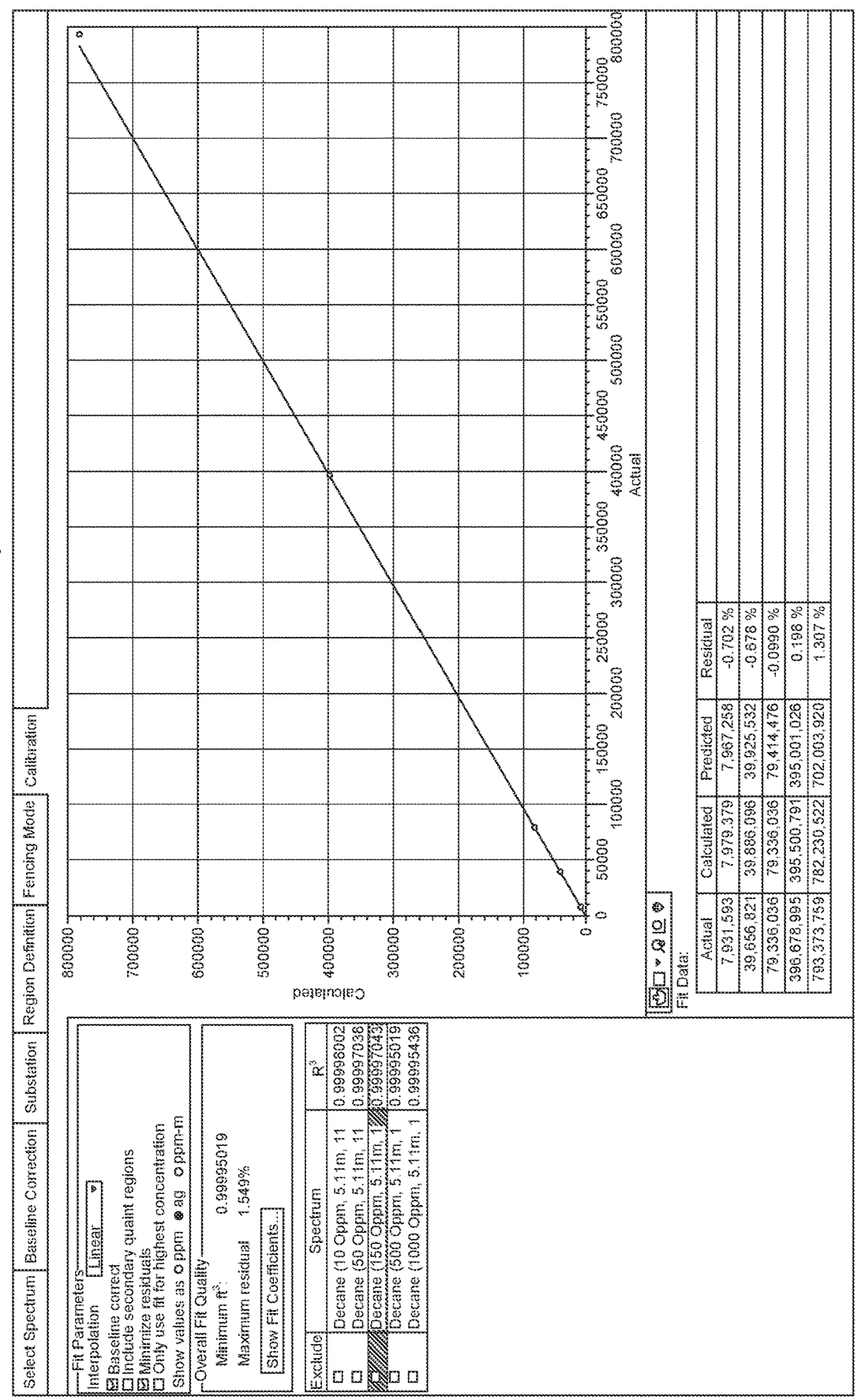
FIG. 13 is a calibration curve of dodecane in amounts from 0 to 800,000 ng.

FIGS. 6-13 are illustrative plots obtained in the analysis of a sample oil in biogas, with FIG. 6 showing the FTIR spectrum of direct vaporization of oil into a nitrogen gas (N2) stream. Dodecane is commonly utilized to match heavy hydrocarbons like diesel fuel and oil. Examples that use dodecane calibrations to detect and quantify the sample oil are presented in the plots (absorbance as a function of wavefunction) of FIGS. 7 and 8. A sample oil versus pentadecane calibration is shown in the absorbance as a function of wavenumber plot of FIG. 9. The results indicate that the $CH_2$ to $CH_3$ ratio in the sample oil is significantly different from the $CH_2$ to $CH_3$ ratio in pentadecane. Decane, on the other hand, provides a very close match of the $CH_2$ to $CH_3$ ratio in the sample oil, as shown in FIG. 10. Shown in FIG. 11 is an absorbance versus wavenumber plot of the C—C region of an oil versus decane calibration. The plot indicates a quanted value that is closer to the expected concentration. The absorbance as a function of wavelength plot of FIG. 12 is based on an octane calibration of the oil. Although octane has a higher $CH_3$ to $CH_2$ ratio, it still provides a similar concentration as the other calibration compounds. FIG. 13 provides a linear calibration curve for decane at levels from 0 to 800,000 ng, showing a constant calibration.

Some of the experiments conducted using the approach described above indicated that the oil appeared to resemble decane at 4 to 1. Other suitable methods or software packages can be employed to suggest or pinpoint the most likely oil components present in the sample.

Once the oil mass value is determined it can be divided by the original sample volume to calculate the pg/L or oil present in the biogas. This result can be reported to a process distributed control system (DCS) at the plant.

While this invention has been particularly shown and described with references to preferred embodiments thereof, it will be understood by those skilled in the art that various changes in form and details may be made therein without departing from the scope of the invention encompassed by the appended claims.

What is claimed is:

1. A thermal desorption tube collection system comprising:
   a first thermal desorption tube and a second thermal desorption tube;
   a first heat sink in thermal contact with the first thermal desorption tube;
   a second heat sink in thermal contact with the second thermal desorption tube; and
   a thermoelectric cooler for cooling one of the first and second thermal desorption tubes while heating the other thermal desorption tube, wherein the first and second heat sinks are located on opposite sides of the thermoelectric cooler.

2. The thermal desorption collection system of claim 1, wherein each of the two thermal desorption tubes is connected to a manifold and/or a vacuum pump.

3. The thermal desorption collection system of claim 2, wherein a flow through each of the two thermal desorption tubes is controlled by a mass flow controller or a rotometer.

4. The thermal desorption collection system of claim 1, wherein the cooled thermal desorption tube is operates in a sample collecting mode while the heated thermal desorption tube operates in a sample analysis mode.

5. The thermal desorption collection system of claim 1, wherein the thermoelectric cooler is computer controlled.

6. The thermal desorption collection system of claim 1, wherein the at least one thermal desorption tube is inserted into a hole formed in the heat sink.

7. A sample analysis system comprising the thermal desorption collection system of claim 1.

8. A sample analysis system comprising:
 a first thermal desorption tube and a second thermal desorption tubes configured for a sample collection and sample analysis ping pong arrangement;
 a first heat sink in thermal contact with the first thermal desorption tube and a second heat sink in thermal contact with the second thermal desorption tube;
 a thermoelectric cooler for cooling one of the first and second thermal desorption tubes while heating the other thermal desorption tube, wherein the first and second heat sinks are located opposite sides of the thermoelectric cooler;
 and
 a sample cell for receiving desorbed material from the first and second thermal desorption tubes and electromagnetic radiation for a spectrometric analysis of compounds in the sample cell.

9. The sample analysis system of claim 8, wherein the spectrometric analysis is FTIR spectrometry.

10. The sample analysis system of claim 8, wherein the thermoelectric cooler includes a Peltier thermoelectric device.

11. The sample analysis system of claim 8, wherein an input director system selectively couples inputs of the thermal desorption tubes to either a gas to be analyzed or a carrier gas.

12. The sample analysis system of claim 8, further comprising a gas chromatography system for separating a vapor desorbed from the heated thermal desorption tube into components, and wherein an output director system selectively couples outputs from the thermal desorption tubes to either the gas chromatography system or a vacuum pump.

13. A method for collecting and analyzing a sample, the method comprising:
 collecting a gas or vapor on a first thermal desorption tube, wherein the first thermal desorption tube is cooled by a thermoelectric cooler via a first heat sink, while desorbing a material collected on a second thermal desorption tube, wherein the second desorption tube is heated by the thermoelectric cooler via a second heat sink, wherein the first and second heat sinks are located on opposite sides of the thermoelectric cooler;
 directing the desorbed material to a sample cell; and
 detecting compounds in the sample cell.

14. The method of claim 13, wherein the compounds in the sample cell are detected by FTIR.

15. The method of claim 13, wherein the gas or vapor collected on the first thermal desorption tube is obtained from a sample gas tube.

16. The method of claim 13, further comprising selectively coupling the inputs of the first and second thermal desorption tubes to either a sample gas or a carrier gas.

17. The method of claim 13, wherein directed the desorbed material to the sample cell includes first directing the desorbed material to a gas chromatography system, and then directing separated components from the gas chromatography system to the sample cell.

18. The method of claim 13, wherein the sample is a biomethane gas sample.

* * * * *